（12） United States Patent
Lee

(10) Patent No.: US 6,762,889 B2
(45) Date of Patent: Jul. 13, 2004

(54) COMPACT TELEPHOTO LENS FOR GRATING SCALE POSITION MEASURING SYSTEM

(75) Inventor: Hakchu Lee, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 28 days.

(21) Appl. No.: 09/998,847

(22) Filed: Nov. 15, 2001

(65) Prior Publication Data

US 2003/0090814 A1 May 15, 2003

(51) Int. Cl.[7] .......................... G02B 3/02; G02B 13/02
(52) U.S. Cl. ..................................... 359/715; 359/747
(58) Field of Search .......................... 359/708, 713–717, 359/745–748

(56) References Cited

U.S. PATENT DOCUMENTS

| 5,151,820 | A | * | 9/1992 | Sillitto et al. | ............... | 359/354 |
| 5,204,774 | A | * | 4/1993 | Owen et al. | ............... | 359/418 |
| 5,754,278 | A | * | 5/1998 | Kurtz | ............... | 355/67 |
| 6,215,755 | B1 | * | 4/2001 | Snyder et al. | ......... | 369/112.24 |
| 6,362,924 | B2 | * | 3/2002 | Ohno | .......................... | 359/689 |

* cited by examiner

Primary Examiner—Scott J. Sugarman
Assistant Examiner—Deborah Raizen

(57) ABSTRACT

A telephoto lens for a grating scale measurement system includes a pair of aspheric lenses that together operate at finite conjugates with minimal spherical aberrations. Identical aspheric lenses provide a subsystem with a magnification of 1×, and a magnifying system typically including one or more negative lens increases the magnification of an intensity pattern to enable accurate measurement of the phase of the intensity pattern.

10 Claims, 2 Drawing Sheets

US 6,762,889 B2

COMPACT TELEPHOTO LENS FOR GRATING SCALE POSITION MEASURING SYSTEM

BACKGROUND

Grating scale position measuring systems precisely measure the movement of an object by observing the light diffracted from a grating attached to the object. FIG. 1 illustrates an example of a grating scale position measuring system 100 that measures the position of an object 110. For the measurements, a reflection grating 120 is mounted on object 110 and illuminated with a collimated light beam 130 from a laser or other beam source 140.

Grating 120 diffracts light beam 140 into a zero order maximum centered on a beam X0, a first order maxima centered on beams X1, second order maxima centered on beams X2, and higher order maxima (not shown). A lens 150 in system 100 receives the diffracted light and focuses light from the first order maxima X1 onto an image plane 170. A spatial filter 160 selectively transmits the light in the first order maxima and blocks the rest of the light diffracted from grating 120.

On image plane 170, light from the first order maximum forms a periodic intensity distribution 175 having a spatial period (or wavelength) that depends on the line spacing of gating 120 and the magnification of lens 150. The location or phase of periodic intensity distribution 175 depends on the location of grating 120. Accordingly, as object 110 and grating 120 move perpendicular to incident beam 140, periodic intensity distribution 175 shifts on image plane 170.

Detectors 180 measure light intensity at spatially separated locations along image plane 170. Differences in the measured intensities at the spatially separated points indicate the location or phase of periodic intensity distribution 175. Accordingly, movement or a phase change in periodic intensity distribution 175 indicates movement of object 110. Detectors 180 measure the phase change of periodic intensity distribution 175 and thereby measure the movement of object 110.

For precise measurements, detectors 180 require a sharp image on image plane 170. In particular, using a spherical lens for lens 150 causes spherical aberrations that blur intensity distribution 175 making it difficult for detectors 180 to measure the phase of intensity distribution 175. An aspheric lens can reduce spherical aberrations, but a standard off-the-shelf aspheric lens minimizes spherical aberrations if the object is at infinity. In system 100, light from first order beams X1 diverge from grating 120 so that the approximation of an object at infinity is inaccurate. Accordingly, even with an aspheric lens, aberrations can cause accuracy problems.

System 100 also has a drawback in that most applications of system 100 require a relatively large distance between lens 150 and image plane 170. For example, when object 110 is a stage for a wafer in an integrated circuit fabrication device, the clearance between object 100 and lens 150 needs to be about 19 mm or more, which leads to an object distance of about 19 mm or more. Additionally, with a reasonable size grating (e.g., a 10 μm pitch), detectors 180 require a magnification of 9× or more of the grating pitch to allow measurement of the phase of periodic intensity distribution 175. The clearance and magnification requirements result in a total optical path length of about 200 mm between the object and the image. A 200 mm long measuring device is often too large in space critical systems such as typical integrated circuit fabrication equipment.

Folding mirrors can fold the optical length inside a relatively compact package. One exemplary system employs seven folding mirrors to reduce size of the measurement device. However, the folding mirrors require alignment, which increases manufacturing costs. Additionally, the positions of folding mirrors are subject to drift during use of the measurement system, and periodic recalibration of the measurement system can be inconvenient or unacceptable in some applications.

In view of the drawback of existing grating scale position measuring systems, a system is desired that provides a compact device, does not require complicated mirror alignment, is not subject to measurement drift, and provides a light intensity distribution with a magnification and clarity that permits precise phase measurements.

SUMMARY

In accordance with an aspect of the invention, a grating scale position measuring system uses a telephoto lens that includes a pair of aspheric lenses positioned for finite conjugates. An additional magnifying system in the telephoto lens can magnify a periodic intensity distribution (i.e., the image) in the image plane to the size required for accurate phase measurements. The magnifying system can use spherical lenses because the aspheric lenses focus light to within a small aperture in the magnifying system, and the rays through the aperture are sufficiently paraxial to avoid introducing significant spherical aberrations.

One specific embodiment of the invention is a telephoto lens that includes a first aspheric lens and a second aspheric lens positioned to form a subsystem that operates at finite conjugates. In one particular configuration, the first aspheric lens is positioned so that an object is at a focal point of the first aspheric lens, and the second aspheric lens is positioned so that an image of the first aspheric lens is an object of the second aspheric lens. The aspheric lenses can be substantially identical and positioned so that the subsystem provides a real image with unit magnification. A magnifying system, that may include one or more negative lens, can magnify the image from the subsystem.

Another embodiment of the invention is a grating scale measurement system that includes a telephoto lens and a detector. The telephoto lens forms an image of a grating, and the detector measures movement of an intensity distribution that the telephoto lens forms in an image plane. The telephoto lens generally includes multiple aspheric lenses having configurations such as in the telephoto lenses described above.

BRIEF DESCRIPTION OF THE DRAWINGS

Use of the same reference symbols in different figures indicates similar or identical items.

DETAILED DESCRIPTION

A telephoto lens for a grating scale position measuring system includes a pair of aspheric lenses arranged to work at finite conjugates without introducing spherical aberrations associated with spherical lenses or with an aspheric lens (made for infinite conjugates) having the object and image at finite distances. An additional magnifying system that magnifies the image/intensity pattern for phase measurement can be positioned so that only a small on-axis portion of the magnifying system forms the image/intensity pattern. Accordingly, the magnifying system can use spherical lenses without introducing unacceptable spherical aberrations. Additionally, the telephoto lens can achieve the required image quality and magnification for precise measurements of the phase of the periodic intensity pattern and provide an optical path length that is significantly shorter than the optical path length of a single lens system. A compact measurement device can thus be made without having a large number of folding mirrors.

Figure 1:
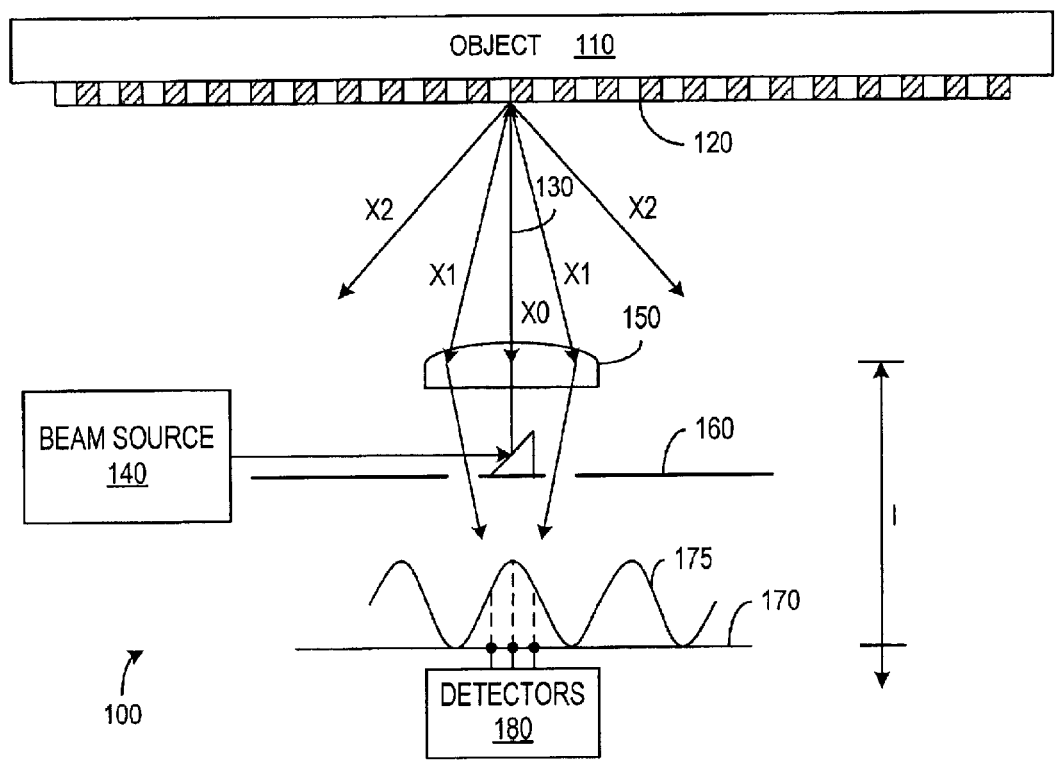
FIG. 1 shows a known grating scale position measuring system.
Figure 2:
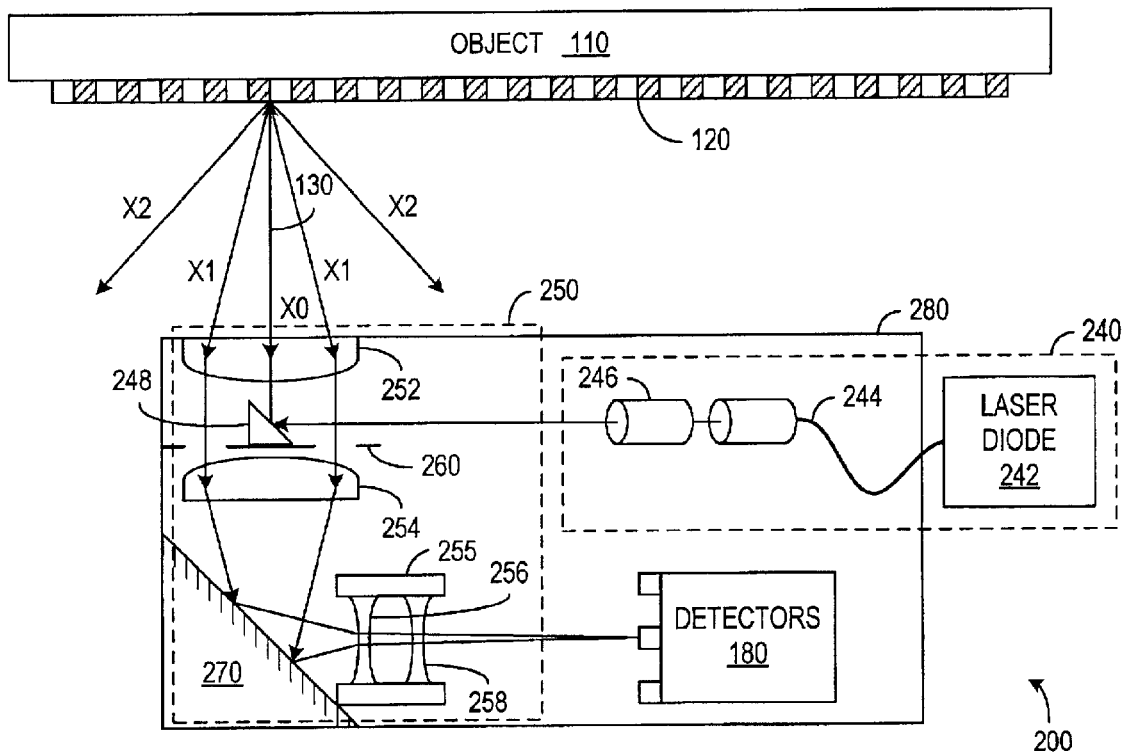
FIG. 2 shows a grating scale position measuring systems in accordance with an embodiment of the invention.

FIG. 2 illustrates a grating scale position measuring system 200 in accordance with an embodiment of the invention. System 200 measures the movement of a grating 120 that is attached to an object 110 and particularly measures the motion along an axis extending along the surface of grating 120 and perpendicular to the reflective lines that form grating 120. In an exemplary embodiment of the invention, grating 120 includes a series of rectangular chrome strips, with each strip being about 9 to 10 $\mu$m wide and separated from nearest neighboring strips by about 5 $\mu$m (for a pitch or line spacing of 15 $\mu$m.)

Object 110 can be a stage that holds and positions a wafer for a fabrication processes, but more generally, system 200 can measure movement of any object along the grating. For a stage or other object have freedom of motion in multiple directions, motion is typically limited to one axis at a time, and a separate measurement system such as system 200 can be used to measure motion along other motion axes.

System 200 includes a beam source 240, a telephoto lens 250, a spatial filter 260, and detectors 180. In the illustrated embodiment, beam source 240 includes a laser diode 242 that provides incident beam 130 via an optical fiber 244, a collimating lens 246, and a mirror 248. The resulting collimate beam 130 preferably has a diameter of about 0.15 mm. Laser diode 242 is kept outside a case 280 of system 200 to reduce disturbances of the thermal environment of the measurement optics. Optical fiber 244, collimating lens 246, and mirror 248 are attached to case 280 and aligned during manufacture of system 200.

Telephoto lens 250 includes a pair of aspheric lenses 252 and 254 and a magnifying system 255. Generally, lenses 252 and 254 are standard aspheric lenses such as commercially available from suppliers such as Geltech, Inc. Standard aspheric lenses minimize spherical aberrations when imaging an object at infinity.

Lens 252 has its object (i.e., grating 120) in the focal plane of aspheric lens 252, and a spatial filter 260 passes only the reflected light corresponding to the first order maxima of grating 120. The object for aspheric lens 254 is the image that aspheric lens 252 forms at infinity using light from the first order maxima. Accordingly, a subsystem including aspheric lenses 252 and 254 has an image in the focal plane of aspheric lens 254 and provides minimal spherical aberrations in that image.

Lenses 252 and 254 can be but are not required to be identical. When identical, aspheric lenses 252 and 254 form a subsystem with a magnification of 1×. However, focal lengths of aspheric lenses 252 and 254 can be different to provide magnification.

System 200 employs a simple configuration with a folding mirror 270 that reflects light from aspheric lens 254 into magnifying system 255. Mirror 270 is an optional element that permits an even more compact case 280 for system 200. Clips (not shown) can hold mirror 270 directly in contact with case 280 to avoid use of adhesives that could shrink over time and cause drift in the calibration of the measurements.

In the illustrated embodiment, magnifying system 255 includes two lenses 256 and 258 having negative focal lengths. The two lenses 256 and 258 can be held in a mount using a tube to keep lenses 255 and 256 in alignment. Alternative embodiments of magnifying system 255 could include a single negative lens or three or more negative lenses with or without additional optical elements. More generally any type of magnifying system including magnifying elements such as mirrors or lenses could be used. As described further below, the configuration of FIG. 2 can provide the required image quality and magnification with an object-to-image distance that is significantly less than a single lens design can achieve.

Detectors 180 include three photodetectors that measure light intensity at three seperated points in the image plane of telephoto lens 250. In an exemplary embodiment, telephoto lens 250 provides an intensity distribution having a spatial period of about 45 $\mu$m, and detectors 180 measure light intensity at points that are about 15 $\mu$m or 120° apart. Detectors provide three intensity measurements that a processing system (not show) uses to determine the phase of the intensity distribution. Changes in the phase indicate movement of the intensity distribution and corresponding movement of object 110.

Table 1 contains an optical listing of telephoto lens 250 in an exemplary embodiment of the invention. In Table 1, each row corresponds to an optical surface. The column entitled "Element" indicates the reference number in FIG. 2 of the element providing the optical surface described in the row. Coordinate Zvx indicates the vertex location in mm of the optical surface. Index indicates the index of refraction preceding the optical surface. Curvature indicates the radius of curvature of the optical surface. For aspheric surfaces, A4 and A6 are asphere power series coefficients, and S is the shape factor of the optical surface

TABLE 1

Optical Listing of Exemplary Embodiment

| Element | Zvx | Index | Curvature | A4 | A6 | S |
|---|---|---|---|---|---|---|
| 252 | 16.995 | 1.000 | 0 | | | |
| 252 | 19.195 | 1.597 | −0.091093 | −4.4947E−6 | −4.49161E−8 | .457071 |
| 254 | 20.00 | 1.000 | 0.091093 | −4.4947E−6 | −4.49161E−8 | .457071 |
| 254 | 22.20 | 1.597 | 0 | | | |
| 256 | 35.45 | 1.000 | −0.18050 | | | |
| 256 | 37.45 | 1.510 | 0.18050 | | | |

TABLE 1-continued

Optical Listing of Exemplary Embodiment

| Element | Zvx | Index | Curvature | A4 | A6 | S |
|---|---|---|---|---|---|---|
| 258 | 40.83 | 1.000 | −0.18050 | | | |
| 258 | 42.83 | 1.510 | 0.18050 | | | |
| 180 | 54.669 | 1.000 | 0 | | | |

In the embodiment of Table 1, symmetry exists between two aspheric lenses 252 and 254, which as a subsystem forms a real image of unit magnification. This design feature is important since most off-the-shelf aspheric lenses are made for infinite conjugates (i.e., are made to correct for spherical aberrations when the object is at infinity.) By combining the two aspheric lenses in a symmetric arrangement, the system operates at finite conjugates and still has minimal spherical aberrations.

Figure 3:
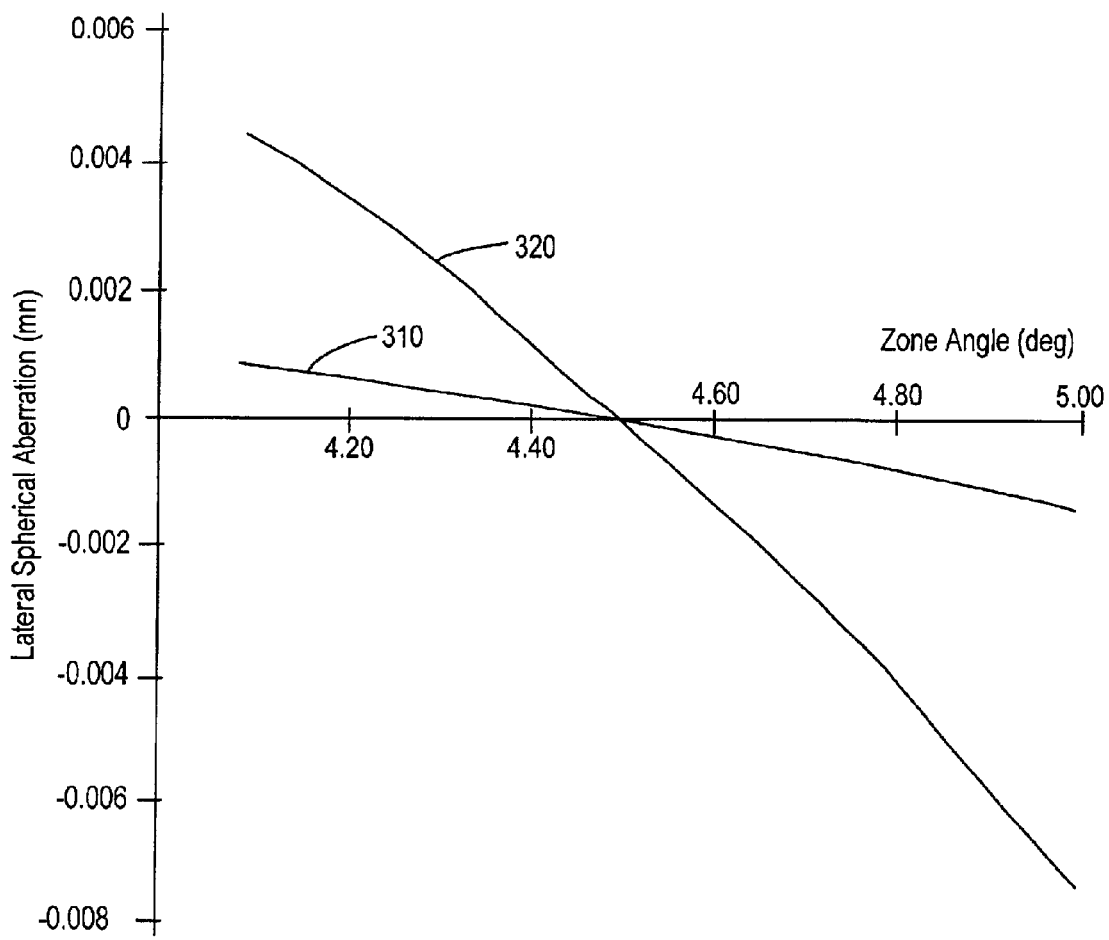
FIG. 3 shows a comparison of spherical aberrations in a single lens system and a system in accordance with an embodiment of the invention.

Although the aspheric lens pair introduces minimal spherical aberration, magnifying system 255, which includes two negative lenses 256 and 258 in the embodiment of Table 1, introduces spherical aberrations. However, magnifying system 255 has a relatively small effect on the spherical aberrations because after encountering the first surface of the first negative lens propagating rays are nearly paraxial. FIG. 3 illustrates how the spherical aberrations 310 of a telephoto lens having the design of Table 1 are less than the spherical aberrations 320 in a system using a single aspheric lens.

A further advantage of the telephoto lens of Table 1 is the total object-to-image distance is less than 55 mm, which is slightly more than one-quarter the object-to-image distance of about 200 mm, which a comparable single lens requires. The reduction in optical path length allows a compact measurement system without requiring a larger number of folding mirrors.

Although the invention has been described with reference to particular embodiments, the description is only an example of the invention's application and should not be taken as a limitation. Various adaptations and combinations of features of the embodiments disclosed are within the scope of the invention as defined by the following claims.

I claim:

1. A telephoto lens comprising:
   a first aspheric lens and a second aspheric lens positioned to form a subsystem that operates at finite conjugates; and
   a magnifying system positioned to magnify an image of the subsystem, wherein the magnifying system comprises a first negative lens, which has a negative focal length.

2. The telephoto lens of claim 1, wherein the magnifying system further comprises a second negative lens, which has a negative focal length.

3. The telephoto lens of claim 1, wherein the first and second aspheric lenses are substantially identical.

4. A telephoto lens comprising:
   a first aspheric lens and a second aspheric lens positioned to form a subsystem that operates at finite conjugates; and
   a magnifying system positioned to magnify an image of the subsystem, wherein:
      the first aspheric lens is positioned so that an object is at a focal point of the first aspheric lens; and
      the second aspheric lens is positioned so that an image of the first aspheric lens is an object of the second aspheric lens.

5. The telephoto lens of claim 1, wherein the first and second aspheric lenses are substantially identical.

6. The telephoto lens of claim 4, wherein the subsystem including the first and second aspheric lenses provides unit magnification.

7. A telephoto lens comprising:
   a first aspheric lens and a second aspheric lens positioned to form a subsystem; and
   a magnifying system positioned on an image side of the subsystem to magnify an image of the subsystem, wherein the magnifying system comprises a first negative lens, which has a negative focal length, and a second negative lens, which has a negative focal length.

8. A telephoto lens comprising:
   a first aspheric lens and a second aspheric lens positioned to form a subsystem, wherein the first and second aspheric lenses are substantially identical; and
   a magnifying system positioned on an image side of the subsystem to magnify an image of the subsystem, wherein the magnifying system comprises a first negative lens, which has a negative focal length.

9. A telephoto lens comprising:
   a first aspheric lens and a second aspheric lens positioned to form a subsystem of unit magnification; and
   a magnifying system positioned on an image side of the subsystem to magnify an image of the subsystem, wherein the magnifying system comprises a first negative lens, which has a negative focal length.

10. The telephoto lens of claim 1, wherein the subsystem including the first and second aspheric lenses provides unit magnification.

* * * * *